United States Patent
Christiansen et al.

(10) Patent No.: US 9,695,764 B1
(45) Date of Patent: Jul. 4, 2017

(54) MULTI-FUEL MARINE ENGINE CONTROL SYSTEM

(71) Applicant: Brunswick Corporation, Lake Forest, IL (US)

(72) Inventors: Erik J. Christiansen, West Bend, WI (US); Jason F. Pugh, Ripon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/797,910

(22) Filed: Jul. 13, 2015

Related U.S. Application Data

(60) Provisional application No. 62/114,381, filed on Feb. 10, 2015.

(51) Int. Cl.
| | | |
|---|---|---|
| *F02D 41/00* | (2006.01) | |
| *F02P 5/04* | (2006.01) | |
| *F02D 41/14* | (2006.01) | |
| *F02D 11/02* | (2006.01) | |

(52) U.S. Cl.
CPC .......... *F02D 41/0025* (2013.01); *F02D 11/02* (2013.01); *F02D 41/1497* (2013.01); *F02P 5/045* (2013.01)

(58) Field of Classification Search
CPC .. F02D 41/0025; F02D 11/02; F02D 41/1497; F02P 5/045
See application file for complete search history.

(56) References Cited

U.S. PATENT DOCUMENTS

| | | |
|---|---|---|
| 4,280,465 A | 7/1981 | Staerzl |
| 4,462,346 A | 7/1984 | Haman et al. |
| 4,556,077 A | 12/1985 | Peyton |
| 4,712,527 A | 12/1987 | Staerzl |
| 4,739,742 A | 4/1988 | Staerzl |
| 4,763,626 A | 8/1988 | Staerzl |
| 4,777,913 A | 10/1988 | Staerzl et al. |
| 4,940,027 A | 7/1990 | Garms |
| 4,964,387 A | 10/1990 | Hansen |
| 5,005,549 A | 4/1991 | Pernpeintner et al. |
| 5,113,780 A | 5/1992 | Bennett et al. |
| 5,205,427 A | 4/1993 | Crago et al. |
| 5,443,046 A | 8/1995 | White |
| 5,890,459 A | 4/1999 | Hedrick et al. |
| 5,983,932 A | 11/1999 | Wagner et al. |
| 6,237,891 B1 | 5/2001 | Stiner et al. |
| 6,405,714 B1 | 6/2002 | Bylsma et al. |
| 6,616,490 B2 | 9/2003 | Wada et al. |
| 6,704,643 B1 | 3/2004 | Suhre et al. |
| 6,757,606 B1 | 6/2004 | Gonring |
| 6,758,198 B1 | 7/2004 | Suhre et al. |

(Continued)

OTHER PUBLICATIONS

HP1200 Sci Dry Sump, Mercury Owner's Manual 90-8M8024621, copyright 2009, pp. 15 and 17-20.

*Primary Examiner* — Mussa A Shaawat
*Assistant Examiner* — Michael Kerrigan
(74) *Attorney, Agent, or Firm* — Andrus Intellectual Property Law LLP

(57) ABSTRACT

A marine drive system includes an engine, a fuel system that provides at least two different fuels to the engine, and a fuel selection means for selecting a fuel type. A control unit accesses a set of fuel-specific operating parameters based on the selected fuel type and controls the engine based on the set of fuel-specific operating parameters.

15 Claims, 6 Drawing Sheets

(56) References Cited

U.S. PATENT DOCUMENTS

| | | |
|---|---|---|
| 6,923,165 B1 | 8/2005 | Draves et al. |
| 6,932,056 B1 | 8/2005 | Tartt |
| 7,188,581 B1 | 3/2007 | Davis et al. |
| 8,131,412 B2 | 3/2012 | Larsson et al. |
| 8,682,516 B1 | 3/2014 | Balogh et al. |
| 8,989,954 B1 * | 3/2015 | Addepalli ............ H04W 4/046 370/328 |
| 2007/0034186 A1 * | 2/2007 | Hefley .................. F02B 69/02 123/197.4 |
| 2013/0151027 A1 * | 6/2013 | Petrucci ............... B60R 16/037 701/1 |

* cited by examiner

MULTI-FUEL MARINE ENGINE CONTROL SYSTEM

CROSS-REFERENCE TO RELATED APPLICATION

The present application is based on and claims priority to U.S. Provisional Patent Application Ser. No. 62/114,381 filed Feb. 10, 2015, the disclosure of which is incorporated herein by reference.

FIELD OF THE INVENTION

The present disclosure relates to marine propulsion systems, and more specifically to control systems for marine engines capable of running on different types of fuel.

BACKGROUND

U.S. Pat. No. 6,757,606 discloses a method for controlling the operation of an internal combustion engine that includes the storing of two or more sets of operational relationships which are determined and preselected by calibrating the engine to achieve predetermined characteristics under predetermined operating conditions. The plurality of sets of operational relationships are then stored in a memory device of a microprocessor and later selected in response to a manually entered parameter. The chosen set of operational relationships is selected as a function of the selectable parameter entered by the operator of the marine vessel and the operation of the internal combustion engine is controlled according to that chosen set of operational parameters. This allows two identical internal combustion engines to be operated in different manners to suit the needs of particular applications of the two internal combustion engines.

U.S. Pat. No. 6,758,198 discloses a method for determining the proper fueling of an internal combustion engine when nitrous oxide is being injected into the air intake of the engine, including determining an equivalent air per cycle (APCequiv) by calculating the effect of both the air and the nitrous oxide on the oxygen content of the gas stream flowing into the cylinders of the engine. After calculating the equivalent air per cylinder magnitude, the fuel per cylinder (FPC) is calculated as a function of the stoichiometric air fuel ratio and an equivalence ratio that modifies the stoichiometric air/fuel ratio.

U.S. Pat. No. 4,280,465 discloses an electrical network associated with a throttle-control potentiometer whereby a standard commercially available linear potentiometer having an given angle of electrical-resistance variation may be employed, over an entire lesser angle range of throttle rotation, to provide an output voltage which, for an initial fraction of throttle displacement, is a predetermined substantially linear variation of a given input voltage, and which, for the remaining fraction of throttle displacement, remains substantially constant at the level of the upper end of the linearly varying fraction. A feature of the invention is that the slope and extent of linear variation are selectable, without modification of the linear potentiometer.

U.S. Pat. No. 6,405,714 discloses a method for calibrating an electronic control unit for an internal combustion engine. The electronic control unit may have multiple channels with each channel being adapted to provide an input drive signal to a fuel delivery apparatus. A first channel is selected for calibration. A reference signal of desired and known parameters is also defined. The reference signal is defined such that it is indicative of the cyclical performance of a fuel delivery apparatus such as a fuel injection device. A command signal is generated and passed through the circuitry of the selected channel. The channel circuitry generates a drive signal in response to the command signal. A desired parameter of the drive signal is measured for comparison with the known parameter of the reference signal. If necessary, the command signal is then adjusted so as to produce a modified drive signal which has a parameter with reduced variation from the known reference parameter.

U.S. Pat. No. 8,682,516 discloses in one example, a hybrid marine propulsion system that includes a marine propulsor that propels a marine vessel; an internal combustion engine that selectively powers the marine propulsor; an electric motor that selectively powers the marine propulsor; a controller that controls operation of the internal combustion engine and the electric motor according to a plurality of modes including an engine mode wherein the engine alone powers the marine propulsor and a boost mode wherein the engine and the electric motor together power the marine propulsor; and a user input device that inputs a user-initiated command to the controller to thereby change control from the engine mode to the boost mode. Upon input of the user-initiated command, the controller can maintain an existing output of the internal combustion engine such that the power provided by the electric motor is added to the power already being provided by the internal combustion engine.

U.S. Pat. No. 5,443,046 discloses in a low pressure continuous flow fuel injection system for an internal combustion engine, an electric fuel pump (18) is energized with a variable duty cycle to vary the pumped volume output of the pump according to engine fuel requirements. The duty cycle is varied to energize the pump to pump substantially only the amount of fuel required by the engine, such that at idle or low engine speed, the pump is energized a lower percentage of the time than at high engine speed. Fuel flow through the fuel injector (12) is continuous, but energization of the pump is not, such that the pump is not pumping at full capacity when unneeded. An electric idle air control valve (54) is also energized with a variable duty cycle to vary the amount of bypass idle air supplied to the intake manifold (10).

U.S. Pat. No. 4,940,027 discloses a marine propulsion system having a conduit (14) connected between a water cooled internal combustion engine (4) and a remote fuel tank (12). The conduit has a first passage (16) supplying fuel from the tank to the engine, a second passage (18) supplying cooling water from the engine towards the tank, and a third passage (22) returning water from the second passage back to the engine. The passages are in heat transfer relation to the conduit.

U.S. Pat. No. 6,923,165 discloses a fuel system with a fuel distribution member that has a plurality of passages formed within its unitary structure to allow a water separating fuel filter and a pressure regulator to be attached directly to the fuel distribution member without the need of conduits and hoses connected therebetween. Fuel is received from a mechanical fuel pump and directed through the water separating fuel filter to a fuel manifold that includes first and second fuel rails. The fuel is cooled and pumped through a high pressure fuel filter as it flows to the fuel manifold. The pressure regulator has a pressure relief conduit that returns fuel to the fuel filter for recirculation.

U.S. Pat. No. 6,237,891 discloses a device for supplying an alternate gas fuel to a gas-burning apparatus such that the gas-burning apparatus will receive and burn the alternate gas fuel, the gas-burning apparatus being of a type intended to burn a gas fuel which is different from the alternate fuel and is supplied at a pressure substantially different from that of the alternate fuel. The inventive device comprises: an inlet coupling attachable to a discharge fitting provided on the alternate fuel container and an outlet coupling downstream of the inlet coupling and attachable to an inlet fitting provided on the gas-burning apparatus. When the pressure of the alternate gas fuel is significantly greater than that of the intended fuel, the inventive device preferably also includes a restricting element for restricting flow of the alternate fuel through the device from the inlet coupling to the outlet coupling.

U.S. Pat. No. 4,712,527 discloses a timing circuit for stabilizing idling of an internal combustion engine, particularly marine racing applications where idle speed must be reduced to enable gear engagement, notwithstanding the use of a racing cam otherwise requiring higher idling speed. Delay means (8) provides a radical reduction in spark timing along a negative slope (16) relative to a baseline curve (6) up to a predetermined speed such as 900 rpm at which there is maximum relative timing delay (18). As speed increases in this range, there is more retard because of the negative slope, which further retarded timing slows engine speed, hence providing self-stabilization. As engine speed decreases in such range, there is less retard, and the advanced timing increases engine speed, again providing self-stabilization. At engine speed increases above the predetermined speed such as 900 rpm, there is a rapid advance in timing along a steeper positive slope (20) to merge with the baseline curve (6). Cranking and warm-up control circuitry (12) and acceleration detection circuitry (14) are also provided for eliminating or reducing the relative timing delay under conditions where maximum spark advance is desired.

U.S. Pat. No. 4,739,742 discloses using an intake-manifold vacuum and engine speed to produce an electrical output signal that reflects throttle position. Since the device has no mechanical tie to the throttle, there is none of the hysteresis or mechanical wear that are characteristic of conventional throttle-position sensors. The device comprises a tachometer circuit which is modulated by the signal from a differential-pressure transducer, connected to track the instantaneous pressure drop across the engine throttle. The tachometer output controls the duty cycle of a pulse generator which, in turn, drives an output transistor; a reference potential is applied across the load resistor and emitter of this output transistor, and the output signal is obtained as a d-c control signal, upon filtering the signal from the collector of the output transducer. The transfer function of the device yields maximum output when there is little or no intake vacuum, e.g., at sustained high speed, and minimum output is obtained from minimum speed and maximum vacuum.

U.S. Pat. No. 4,763,626 discloses a feedback fuel metering control system for an internal combustion engine and eliminates the need for high pressure fuel injectors, a high pressure fuel pump and a constant fuel pressure regulator. The system senses the amount of combustion air supplied to the engine, senses fuel flow velocity, and controls the amount of fuel supplied according to the amount of combustion air the fuel flow velocity.

U.S. Pat. No. 6,704,643 discloses a calibration procedure involving the steps of manually placing a throttle handle in five preselected positions that correspond with mechanical detents of the throttle control mechanism. At each of the five positions, one or more position indicating signals are received by a microprocessor of a controller and stored for future use. The five positions comprise wide open throttle in forward gear, wide open throttle in reverse gear, the shift position between neutral and forward gear, the shift position between neutral and reverse gear, and the mid-point of the neutral gear selection range. The present invention then continuously monitors signals provided by a sensor of the throttle control mechanism and mathematically determines the precise position of the throttle handle as a function of the stored position indicating signals. In one embodiment, each position indicating signal comprises three redundant signal magnitudes.

U.S. Pat. No. 8,131,412 discloses a method for calibrating a system for controlling thrust and steering of a drive arrangement in a watercraft that includes an operating device adapted for indicating a requested direction of travel of the watercraft, the operating device being connected to a control unit for providing corresponding thrust and steering commands to the drive arrangement. The method includes receiving an activation command in the control unit, for beginning the calibration, detecting any movements of the operating device, storing values corresponding to the movements in the control unit together with corresponding thrust and steering values, and repeating the detecting step and the storing step until a termination command is received in the control unit, thereby using the stored values in subsequent operation of the operating device for indicating the direction of travel of the watercraft. An arrangement for calibrating a system for controlling thrust and steering of a drive arrangement in a watercraft is also provided.

U.S. Pat. No. 4,964,387 discloses a detonation control system for a fuel injected, spark ignition two-cycle engine utilizing a linear series of engine knock signals and a programmable microprocessor to provide a non-linear series of stepped increases in the fuel injection pulse width to the engine effective to substantially reduce or eliminate engine knock. If desired or necessary, the system may also be utilized to provide a non-linear series of stepped increases in spark ignition retard to further reduce or eliminate engine knock. The non-linear stepped increases in the control parameters have been found to effectively control detonation without adversely affecting engine performance and efficiency.

U.S. Pat. No. 6,932,056 discloses a control method for controlling an internal combustion engine that selects a knock threshold magnitude and compares it to individual knock event magnitudes. The difference between these two values is calculated and limited to be within a predetermined range of values. This limitation selects either an event based control method, a proportional control method, or a control method with characteristics of both techniques. A gain is selected as a function of the algebraic sign of the limited or scaled value and the gain is multiplied by the calculated difference. The result is added to a cumulative value of previously calculated differences multiplied by associated gains. The cumulative value is used as a threshold that activates a plurality of control steps which can include ignition timing changes, fueling changes, or air intake magnitude changes.

U.S. Pat. No. 4,556,077 discloses a valve mechanism for a dual tank fuel supply system that includes a housing (304) communicated to the return circuit (118, 218) and supply circuit (116, 216). The valve mechanism is responsive to pressure differentials between branches (170, 172 and 270, 272) of the supply circuit (216) to switch communication between branches (178, 180, 278, 280) of the return circuit (118, 218) accordingly.

U.S. Pat. No. 4,777,913 discloses an auxiliary fuel supply system for a two cycle internal combustion engine (302). A first fuel line (350) supplies fuel from the fuel pump (338) to a solenoid (352) which is continuously cyclable between ON and OFF states during running of the engine, including high speed operation where detonation may occur. Fuel then flows through a second fuel line (354) to a restriction orifice metering housing (356), and then to a plurality of third branch fuel lines (358, 384, 386, 388, 390 and 392) for delivery to respective cylinders. The restriction orifices provide a pressure drop from the second fuel line to the plurality of third fuel lines, to provide lower fuel pressure in the third fuel lines, to reduce the chance of leakage at the intake manifold (326), and also to reduce fuel pressure fluctuations in the third fuel lines otherwise due to cycling of the solenoid. Metering housing structure is disclosed. The solenoid is controlled by a variable duty cycle oscillator (408), which in turn is controlled by a fuel enrichment signal (84) output by an electronic control which is responsive to engine knock and/or temperature. Control circuitry is disclosed.

U.S. Pat. No. 5,205,427 discloses a modular fuel tank system for use on aircraft and the like including a plurality of nestable shell sections which, when assembled in proper edgewise orientation, form a shell for the fuel tank. A joint assembly secures the shell sections in assembled condition and extends along mating edges of adjacent shell sections. All of the components of a plurality of fuel tanks are housed in a single container for shipping and handling purposes.

U.S. Pat. No. 6,616,490 discloses an outboard motor auxiliary fuel tank/fuel pump assembly that includes an auxiliary fuel tank disposed in an engine compartment and a fuel pump joined to one side of the auxiliary fuel tank for supplying fuel stored within the auxiliary fuel tank to fuel injection valves of an engine. A float of a float valve provided within the auxiliary fuel tank is supported in the auxiliary fuel tank via a pivot shaft that is parallel to a tilt shaft of an outboard motor. First and second mounting bosses on which the fuel pump can be mounted are formed on the right side face and the front end face of the auxiliary fuel tank.

U.S. Pat. No. 5,005,549 discloses a sensor signal from a sensor which measures vibration of an internal combustion engine. The signal is filtered by a filter to provide characteristic frequency components for a normal combustion. When the filter signal remains below a reference value, a fault signal is output to indicate a faulty combustion. The filter may be switchable band-pass filters whose output signals are measured for knocking of the motor or for normal combustion. A programmed control unit evaluates the output signals from the filter within a characteristic time segment.

U.S. Pat. No. 5,113,780 discloses a boat trim control system that includes a pair of trim tabs pivotally mounted to the stern of a boat hull, and an engine responsive to application of electrical ignition power for powering the boat through the water. A pair of fluid actuators extend between the hull and the respective trim tabs for selectively and adjustably moving the tabs between fully extended and fully retracted positions. A fluid drive is responsive to a boat operator for selectively adjusting positions of the trim tabs independently of each other to maintain a desired attitude of the boat hull. Electronic control circuitry is responsive to removal of ignition power from the engine for operating the fluid drive and energizing the actuators for a predetermined time duration so as to move boat trim tabs to the fully retracted positions upon removal of ignition power from the engine.

U.S. Pat. No. 7,188,581 discloses a marine drive and a marine vessel and drive combination that has a trim tab with a forward end pivotally mounted to a marine propulsion device.

U.S. Pat. No. 4,462,346 discloses an internal combustion engine comprising a crankcase, a cylinder extending from the crankcase and having an inlet port, a piston located in the cylinder, a transfer passage located between the crankcase and the cylinder inlet port, a fuel pump adapted to communicate with a source of fuel for normal operation, a carburetor having an air induction passage communicating with the crankcase and including a venturi, which carburetor also includes a float bowl communicating with the fuel pump and a high speed nozzle communicating between the float bowl and the venturi, a low speed fuel nozzle communicating with the transfer passage adjacent the inlet port, and a fuel line communicating between the float bowl and the low speed nozzle and including therein check valve means preventing flow from the transfer passage to the float bowl and permitting flow from the float bowl to the transfer passage, which fuel line also includes fuel flow metering means.

U.S. Pat. No. 5,983,932 discloses a dual tank fuel system having primary and secondary fuel tanks, with the primary tank including a filler pipe to receive fuel and a discharge line to deliver fuel to an engine, and with a balance pipe interconnecting the primary tank and the secondary tank. The balance pipe opens close to the bottom of each tank to direct fuel from the primary tank to the secondary tank as the primary tank is filled, and to direct fuel from the secondary tank to the primary tank as fuel is discharged from the primary tank through the discharge line. A vent line has branches connected to each tank to direct fuel vapor from the tanks as the tanks are filled, and to admit air to the tanks as fuel is delivered to the engine.

U.S. Pat. No. 5,890,459 discloses a standard diesel injection system and a mechanical direct-gas injection system that are selectively operable, in combination with a continuous pilot injection system, to provide a combustion system that is capable of operating in either a conventional diesel mode or a dual-fuel mode. Operation between convention diesel or dual-fuel combustion modes is mechanically controlled by a two-position, four-way control valve. The mechanical direct-gas injection system is actuated by pulsed diesel fuel directed to the actuation chamber of a gas injector by the same injection pump used to provide diesel fuel to the combustion chamber during conventional diesel operation.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine drive system has an engine, a fuel system that provides at least two different fuels to the engine, and a fuel selection means for selecting a fuel type. The marine drive system also has a control unit that accesses a set of fuel-specific operating parameters based on the selected fuel type, and controls the engine based on that set of fuel-specific operating parameters.

One embodiment of a method of operating the marine drive includes selecting a fuel type at a control unit, and accessing a set of fuel-specific operating parameters for a marine engine based on the fuel type. The marine engine is then controlled based on the set of fuel-specific operating parameters.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE DRAWINGS

Figure 1:
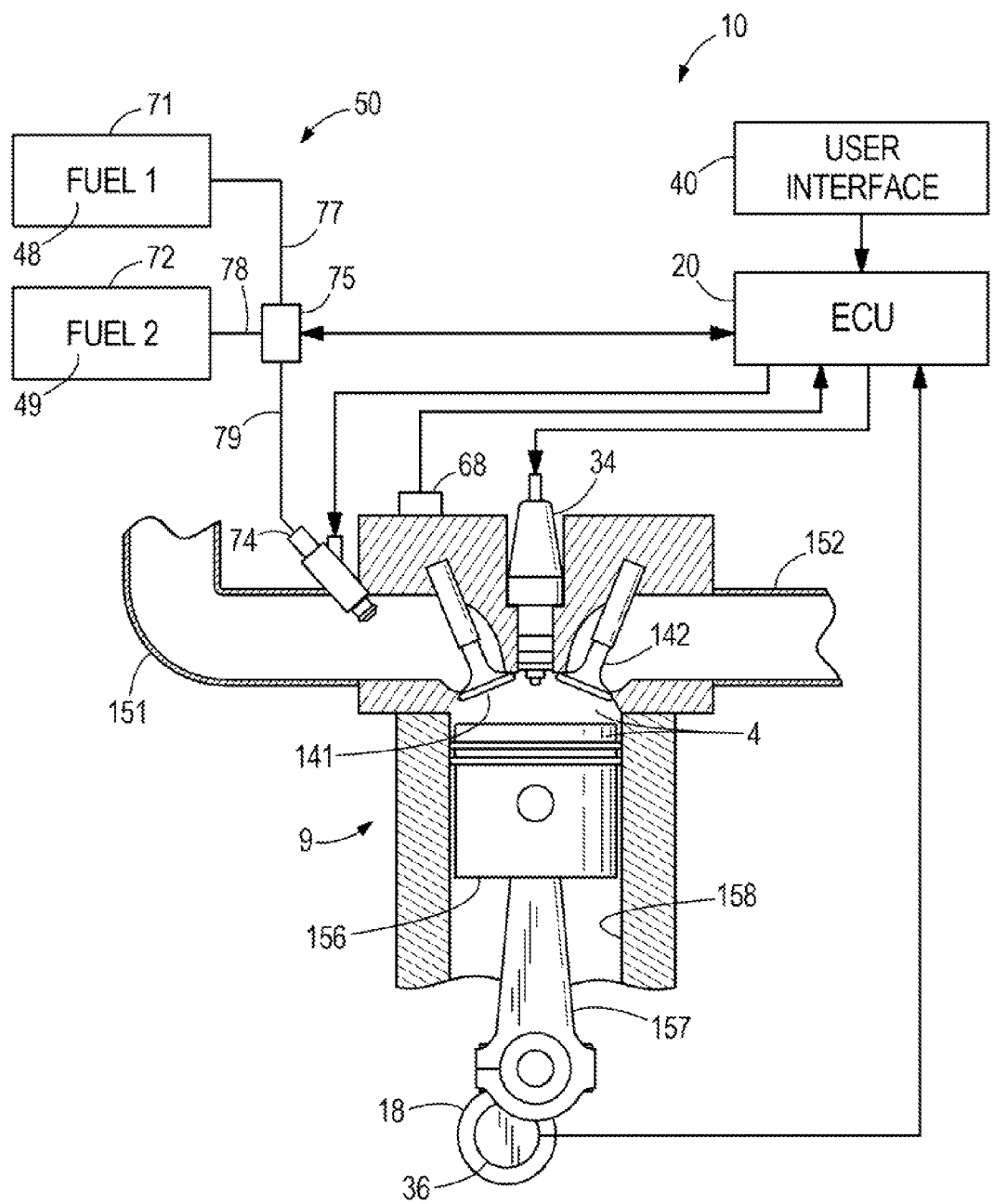
FIG. 1 depicts a cross section of a marine drive system having a fuel system and an ignition system controlled by an engine control unit.

FIG. 1 depicts a cross section of an internal combustion engine having a fuel delivery assembly and an ignition system controlled by an engine control unit ("ECU") 20. The cross section of engine 9 has an intake manifold 151 and an exhaust manifold 152, which are in communication with a piston-cylinder 4 via an intake valve 141 and an exhaust valve 142. In an exemplary embodiment, the engine 9 comprises four piston-cylinders 1-4. The exemplary piston-cylinder 4 has a piston 156 and a cylinder 158. Within the cylinder 158 is a piston 156 connected via a connecting rod 157 to a crankshaft 18. The cross section also comprises fuel injector 74 and a spark plug 34. In this example, the engine 9 is a non-direct injection engine and the fuel injector 74 injects fuel into the intake manifold 151. A sensor 36 is provided in this example for sensing a rotational speed and/or angular position of the crankshaft 18. The sensor 36 is provided in the vicinity of the crankshaft 18 and connecting rod 28 and senses the speed of the engine 9. The sensor 36 need not be located where shown but could be located elsewhere. Further, although not shown in this example, other engine running condition sensors could be provided, such as for example cylinder pressure sensors, manifold pressure sensors, temperature sensors, and throttle sensors. The exemplary system 10 comprises a fuel delivery assembly that is a non-direct injection system. As will be known by one of skill in the art, other fuel delivery assemblies may be employed to execute the systems and methods disclosed herein. For example, appropriate fuel delivery systems may include any direct injection and multiport fuel injection (non-direct inject) systems.

Figure 2:
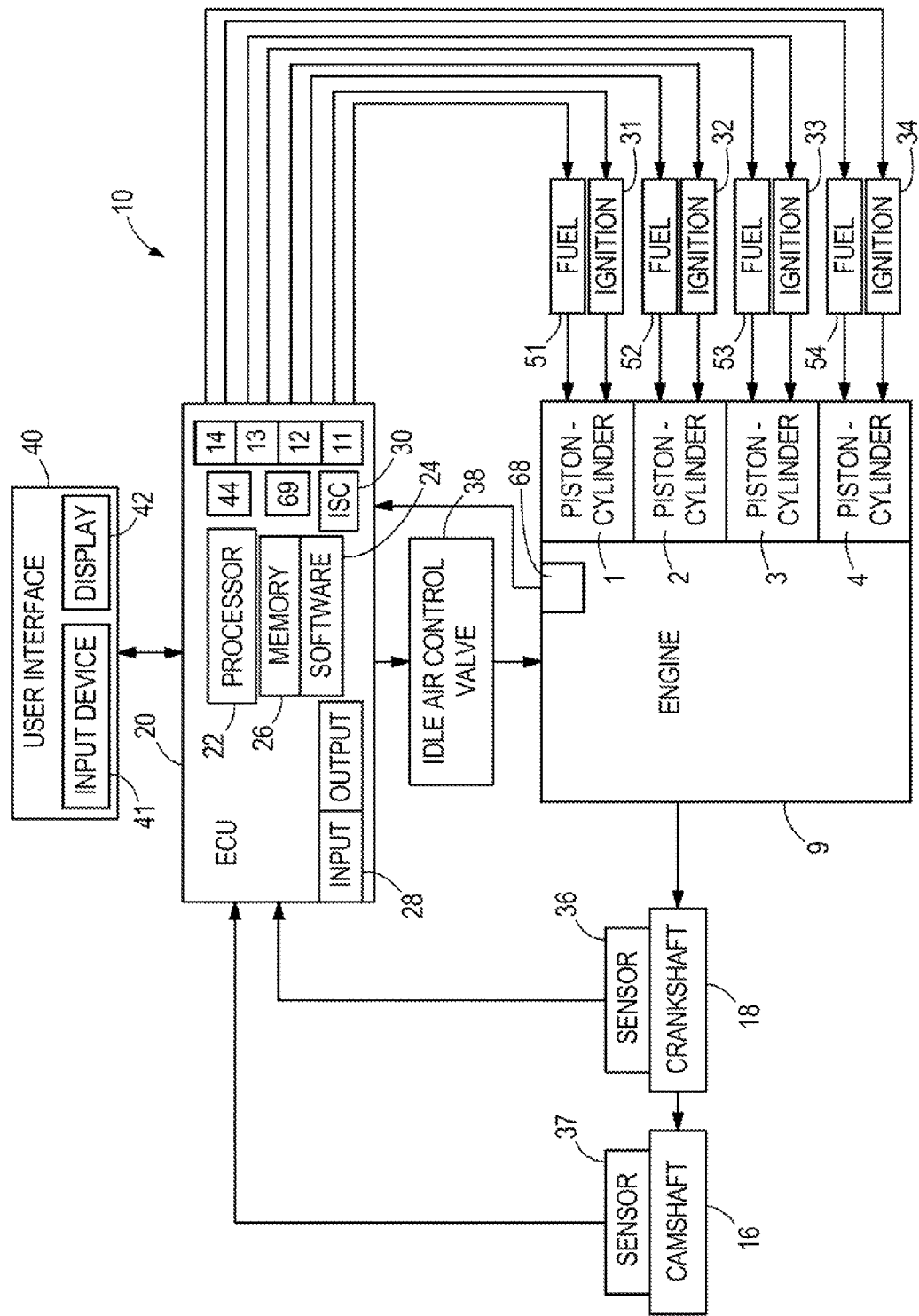
FIG. 2 depicts one embodiment of a marine drive system in accordance with the present disclosure.

FIG. 2 is a schematic showing a non-limiting example of a system 10 for controlling operations of an internal combustion engine 9. In the example of FIGS. 1 and 2, the engine 9 is a four-stroke engine having four piston-cylinders 1-4 that are arranged in an inline formation. However the type of stroke and number of piston-cylinders can vary from that which is shown. For example, the methods and systems disclosed herein may be utilized in engines having any number of cylinders, including two, six, twelve, etc., as will become clear to one of ordinary skill in the relevant art. The arrangement of the piston-cylinders also can vary and in some examples can be arranged in a V-configuration or opposed-configuration instead of an inline configuration. As is conventional, reciprocation of the pistons in the cylinders causes rotation of a crankshaft 18, which in turn causes rotation of a camshaft 16. In situations where the engine 9 is configured for use in marine applications, rotation of the crankshaft 18 and camshaft 16 causes rotation of one or more propulsors (e.g. propellers, impellers, and/or the like) for causing movement of a marine vessel. Such arrangements are known in the art and examples are disclosed in references incorporated herein by reference, including U.S. Pat. Nos. 7,806,741; 7,354,324; 7,299,783; 6,571,753; 6,295,963; 6,109,986; and 5,950,588.

The system 10 includes an Engine Control Unit (ECU) 20 for controlling operations of the engine 9. The ECU 20 is a programmable controller that includes a computer processor 22, software 24, memory (i.e. computer storage) 26 and an input/output (interface) device 28. The processor 22 loads and executes the software 24 from the memory 26. When executed, software 24 controls the engine 9 to operate according to the functionality described in further detail below. In some examples, the processor 22 can comprise a microprocessor and related circuitry that retrieves and executes software 24 from memory 26. Processor 22 can be implemented within a single device, or can alternately be distributed across multiple processing devices or sub-systems that cooperate in executing program instructions. Examples include general purpose central processing units, application specific processors, and logic devices, as well as any other type of processing device, combinations of processing devices, and/or variations thereof. Additional examples of suitable processors are disclosed in U.S. Pat. Nos. 7,941,253 and 6,273,771, which are incorporated herein by reference.

The ECU 20 includes an idle speed controller (ISC) 30, which can be a sub-system of the ECU 20 or a separate controller distinct from the processor 22, software 24, memory 26 and input/output device 28 of the ECU 20. For discussion purposes herein below, the ISC 30 is a sub-system of the ECU 20; however, it should be recognized that this is a non-limiting example and the particular configurations of the ECU 20 and ISC 30 can vary from that which is shown and described. The ISC 30 is configured to maintain the engine 9 at a certain idle speed, which in this disclosure is referred to as an "idle speed setpoint." The idle speed setpoint can be a calibrated engine speed value that typically is selected by the manufacturer through trial and error so as to avoid stalling of the engine 9 when it is operated at idle speed and when it is shifted into forward or reverse gear. Other methods of selecting the idle speed setpoint are known in the art. The ISC 30 is configured to control one or more "combustion inputs" to the piston-cylinders 1-4 to thereby maintain the speed of the engine 9 at the noted idle speed setpoint. Examples of "combustion inputs" can include timing of ignition (i.e. spark provided by spark plugs of ignitions 31-34), quantity and/or rate of fuel provided to the engine, spark energy, spark duration, injection timing, quantity and/or rate of airflow provided to the engine 9 via an idle air control valve 38, and/or the like. In certain examples, the idle air control valve 38 can be an electronic valve located downstream of a main throttle body for the engine 9. The idle air control valve 38 typically is located in the intake air plenum for the engine 9. In certain examples, the ISC 30 can be a proportional integral derivative controller (PID) that calculates and monitors the rate of change of speed of rotation of the crankshaft 18 and how long the rate of change occurs. The ISC 30 is configured to compare the results of this calculation to one or more thresholds stored in the memory 26, and then modify one or more of the noted combustion inputs to thereby maintain the engine 9 at the idle speed setpoint. It will be recognized by one having ordinary skill in the art that the type of ISC 30 can also vary from that which is shown and described. In another example, idle airflow to the engine may be controlled by the ECU 20 via an electronically driven throttle. In this case, a separate idle air control valve is not needed.

The ECU 20 also includes the knock control system 69, which can be a subsystem of the ECU 20 or a separate controller distinct from the processor 22, software 24, memory 26 and input output device 28 of the ECU. The knock control system 69 is configured to detect the presence of a knock, such as via input from knock sensor 68, and then modify one or more of the noted combustion inputs to thereby eliminate the knock. For discussion purposes herein below, the knock control system 69 is a subsystem of the ECU 20; however, it should be recognized that this is a non limiting example and the particular configurations of the ECU 20 and the knock control system 29 can vary from that which is shown and described. Engine knock occurs when the air/fuel mixture in the cylinder 158 detonates incorrectly, such as spontaneous combustion of fuel-air mixture remaining the chamber after a normal combustion burn that has been initiated by a spark plug 74. Such knocking can harm the engine and should be prevented. The knock control system 69 includes a knock sensor 68 that senses the occurrence of a knock. For example, the knock sensor 68 may be an accelerometer that detects vibrations in the engine block. Knock control systems 69, including knock sensor(s) 68, are known in the art and examples are disclosed in U.S. Pat. Nos. 4,621,602, 4,761,992, RE32,667, 4,981,124, 4,964,387, 5,005,549, 5,144,928, 6,932,056, and 7,676,323. It will be recognized by one having ordinary skill in the art that the type and configuration of the knock control system 69 may vary from that which is shown and described.

The system 10 also includes a crankshaft sensor 36 that is configured to sense rotation and position of the crankshaft 18 and then provide electronic signals to the ECU 20 that represent the speed of rotation of the crankshaft 18 and the rotational position of the crankshaft 18. The system may also include a camshaft sensor 37 that senses the rotational speed and position of the camshaft 16, which information also may be employed to determine the rotation cycle of the crankshaft 18. In certain examples, the crankshaft sensor 36 and the camshaft sensor 37 can be conventional encoders located on the crankshaft 18 and camshaft 16, respectively; however, any conventional sensor that is configurable to sense speed of rotation and communicate this information to the ECU 20 can be utilized. In one example, the crankshaft sensor 36 and the camshaft sensor 37 are rotary encoders that provide information about the angular position of the crankshaft 18 and the camshaft 16, respectively, which is then used to determine an engine speed and other operation parameters of the engine.

System 10 also includes fuel system 50. The fuel system 50 includes a fuel delivery assembly 51-54 for each piston-cylinder 1-4. As shown in the exemplary embodiment of FIG. 1, each fuel delivery assembly 51-51 may include a fuel injector 74 physically connected to each piston-cylinder 1-4. The ECU 20 controls the fuel injector 74 in order to deliver an amount of fuel to that piston-cylinder. The fuel is supplied to the fuel injector 74 from one or more fuel tanks via fuel line 79. The fuel system 50 is configured to provide either one of at least two different fuels to the engine 9.

The exemplary fuel system 50 depicted in FIG. 1 comprises two fuel tanks 71 and 72 that each contain a different type of fuel from the other. The fuel system 50 and the ECU 20 may be configured to provide and operate the engine with any two or more types of fuel known in the art, including, without limitation, any petroleum-based fuel (such as diesel, any type of gasoline (such as "pump fuel" available at a standard consumer gas station or high-octane race fuel), jet fuel, military-grade fuels, kerosene, and the like) or biofuels (such as bioethanol, biomethanol, biobutanol, biodiesel, dimethyl ether, biogas, or the like). The two or more fuel types supplied by the fuel system 50 may be housed in separate fuel tanks, or may be alternately contained in a single fuel tank configured to accept either of the at least two types of fuel. In the embodiment of FIG. 1, a first fuel 48 is contained in a first fuel tank 71 and a second fuel 49, which is a different type of fuel than the first fuel 48, is contained in a second fuel tank 72. The first fuel 48 is supplied from the first fuel tank 71 through fuel lines 77, and the second fuel 49 is supplied from the second fuel tank 72 through the fuel line 78. A fuel switching valve 75 is connected to the fuel lines 77 and 78. The fuel switching valve 75 may be controlled by ECU 20 to alternately provide the first fuel 48 or the second fuel 49, depending on which fuel type is selected.

Many high performance marine engines, such as those used in racing competitions, require high-octane race fuel. Such marine engines must be "tuned" for high specific power output to meet performance targets, while still preventing engine damage due to engine knock. The present inventors have recognized that high octane fuel is expensive and may be difficult to obtain in many regions of the world, and thus it is desirable to be able to operate such high performance marine engines on a more commonly available and less expensive type of fuel. The high performance engine 9 may utilize a lower-octane fuel type when a lower level of engine performance is acceptable, such as for pleasure boating or long distance running, or when high octane fuel is not available. Through experimentation and research in the relevant field, the present inventors have recognized that a marine engine capable of running on multiple types of fuel is desirable, and that it may also be desirable to allow the operator to select between operational modes depending on the desired operation of the marine engine and/or the fuel available to the operator. The present inventors have also recognized that selection of an operational mode, such as fuel-specific operating parameters, is preferably accomplished without requiring the operator to replace an engine control module or any other operational software or hardware associated with the engine. A system requiring a hardware or software change is undesirable because it is time consuming for the operator, increases the likelihood of installation error, and increase wear on the system. For example, frequent insertion cycles of a fuel-specific engine control unit can lead to premature failure of the engine control unit, harnesses, and/or connectors.

The present system 10 allows multiple types of fuel to be used in a marine engine without physically switching control hardware, or any other hardware. The ECU 20 of the system 10 contains, or has access to, a set of fuel-specific operating parameters for each of at least two different fuel types. The set of fuel-specific operating parameters is a set of calibrated operating values tuned specifically for a particular type of fuel. For example, the set of fuel-specific operating parameters may be a set of 50 or more different tables that contain control values for various aspects of the system 10. Examples of operating parameters that may be fuel-specific include timing of ignition, quantity and/or rate of fuel provided to the engine, spark energy, spark duration, quantity and/or rate of intake air flow, exhaust control, idle speed setpoint, electronic throttle control and responsiveness, cranking and starting parameters, maximum RPM control, and the like. These fuel-specific operating parameters effect the performance output of the engine, including torque, acceleration, fuel economy idle operation quality, and the like.

Each set of fuel-specific operating parameters is optimized for the fuel type that will be used in the engine 9 and the expected usage of the marine drive system 10 associated with that fuel type. Other operating parameters may not be fuel-specific, and may be the same regardless of the selected fuel type and/or may be chosen by the ECU 20 independently of the selected fuel type. It is known in the art that certain operating parameter calibrations are optimal for a high performance race engines 9 that operate using high-octane race fuel, and that those same operating parameters are calibrated differently in engines 9 geared to pleasure boating or commuting applications. Examples of the optimization of operating parameters for different uses of marine drives are provided at U.S. Pat. Nos. 6,757,606, 4,712,527, 4,739,742, 4,763,626, 4,092,958, 6,704,643, and 8,131,412. However, presently available marine drives do not allow operation of a single engine 9 on either of two or more different types of fuel, wherein the selection of the operation mode and configuration to allow operation on a given one of the two types of fuel is not possible without requiring hardware and/or software changes.

The ECU 20 is configured such that a fuel type may be selected from at least two different fuels, and then to control the engine 9 based on a set of fuel-specific operating parameters optimized for that fuel type. The ECU 20 may automatically select the fuel type, or it may receive a fuel type selection from an operator via a user interface 40. Accordingly, the marine drive system 10 includes a fuel selection means for selecting a fuel type, which may be a software module in the ECU 20 that automatically selects the fuel type according to methods disclosed herein, or maybe any form of a user interface 40 allowing user selection of the fuel type.

Figure 3A:
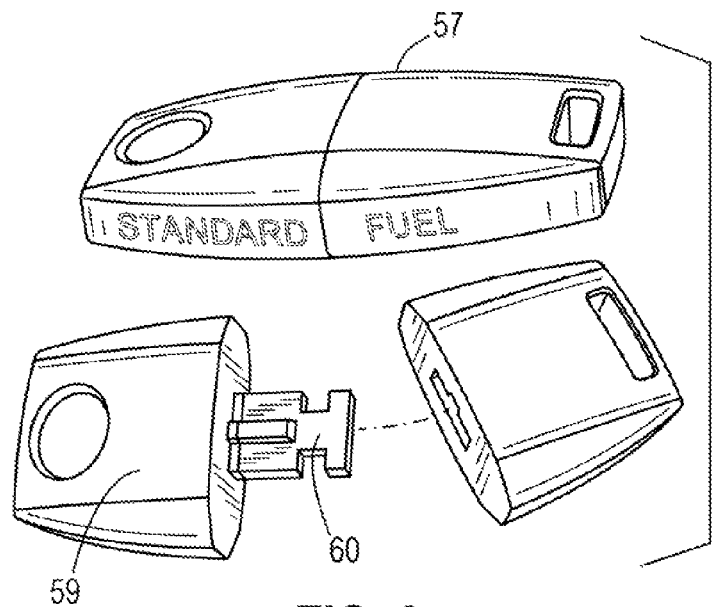
FIGS. 3A and 3B depict one embodiment of the key fob for selecting a fuel type.
Figure 3B:
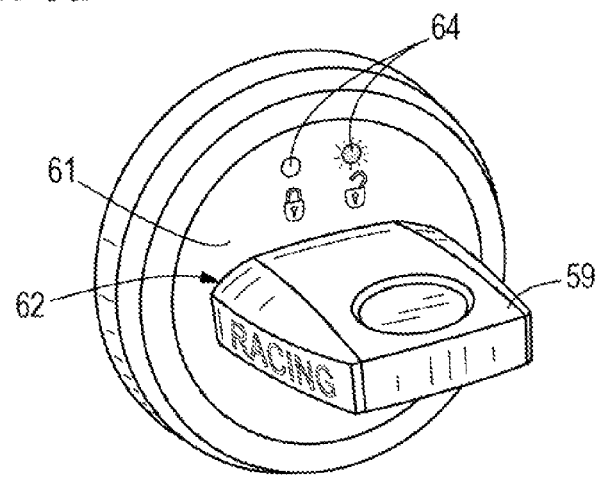
Figure 3C:
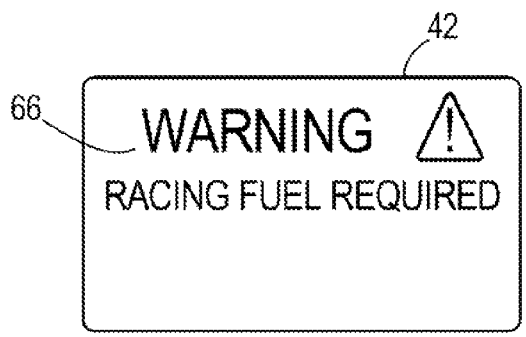
FIG. 3C depicts one embodiment of an alert on a user interface display in accordance with the present disclosure.

FIGS. 3A, 3B, and 3C depict an embodiment of a user interface 40 that includes two key fobs 57 and 59, each of which are associated with a particular fuel type. Key fob 57 is associated with a standard "pump" fuel type (i.e., unleaded fuel available at a consumer gas station), and key fob 59 is associated with a race fuel type. In the depicted embodiment, each key fob 57 and 59 has a key 60 that is inserted into an ignition 61. The key 60 may protrude from the body of the key fob 57 and 59, and thus the key fobs 57 and 59 may include a protective cap as shown. A receiver 62 is embedded in the ignition 61 and receives an identification code from the key fob 57 or 59 when the key 60 is inserted into the ignition 61. Each key fob 57 and 59 has a unique identifier, or set of identifiers, associated therewith that is received by the receiver and identifies a fuel type. The receiver 61 transmits the key fob identifier and/or the fuel type selection to the engine control unit 20. The user interface 40 may further include indicator light 64 associated with the receiver 62 to indicate when the key fob 57 or 59 is properly received. Additionally, a display 42 associated with the user interface 40 may provide an alert 66 indicating when a key fob 57 or 59 has been registered at the receiver 62 and/or which key fob 57 or 59 has been registered. The alert 66 may also indicate additional information about the status of the fuel selection module 44, such as whether the selected fuel type has been verified as correct or determined to be incorrect.

In alternative embodiments, the key fobs 57 and 59 may be in wireless communication with the receiver 62. For example, the key fobs 57 and 59 may be radio frequency identifier devices (RFID) and may communicate the fuel type identifier to the receiver 62 via radio frequency when in a designated range of the receiver 62. In still other embodiments, the fuel selection means may be a different type of user interface 40 that allows an operator to select a fuel type. For example, in other embodiments, the user interface may be a push button, a switch, a control option on a touch screen, or any type of mobile device configured to interface with a receiver in communication with the ECU 20. In one possible embodiment, the fuel selection means may include a mobile device-such as a cell phone, tablet, etc.—equipped with an application that operates the mobile device to communicate wirelessly with the receiver 62 to select the fuel type. For example, the application may allow an operator to select a fuel type on the mobile device—such as via a touch screen on the mobile device—and to send a wireless signal to the receiver indicating the operator's selection. The wireless communication between the mobile device and the receiver 62 may be by any wireless communication standard, such as Bluetooth or the like.

Based on the selected fuel type, the ECU 20 accesses a set of fuel-specific operating parameters associated with that fuel type and controls the engine 9 based on that set of operating parameters. Additionally, depending on the configuration of the fuel delivery system 50, the ECU 20 may also operate a physical device to deliver the fuel associated with the selected fuel type to the engine 9. In the embodiment of FIG. 1, for example, the ECU 20 may instruct the fuel switching valve 75 to switch to a position to deliver the first fuel 48 or the second fuel 49, whichever is appropriate. Alternatively or additionally, the ECU 20 may invoke additional functionality associated with the expected performance of the marine drive based on the selected fuel type. For example, if a race fuel type is selected, the ECU 20 may activate one or more race performance control systems that improve performance or handling of the marine drive or marine vessel when operated under racing conditions, such as trim tab systems or power-boost systems. Many such race performance control systems are known in the art and are described in patents incorporated herein by reference, including U.S. Pat. Nos. 5,113,780, 7,188,581, 6,583,728, 4,777,913, and 6,758,198.

Figure 4:
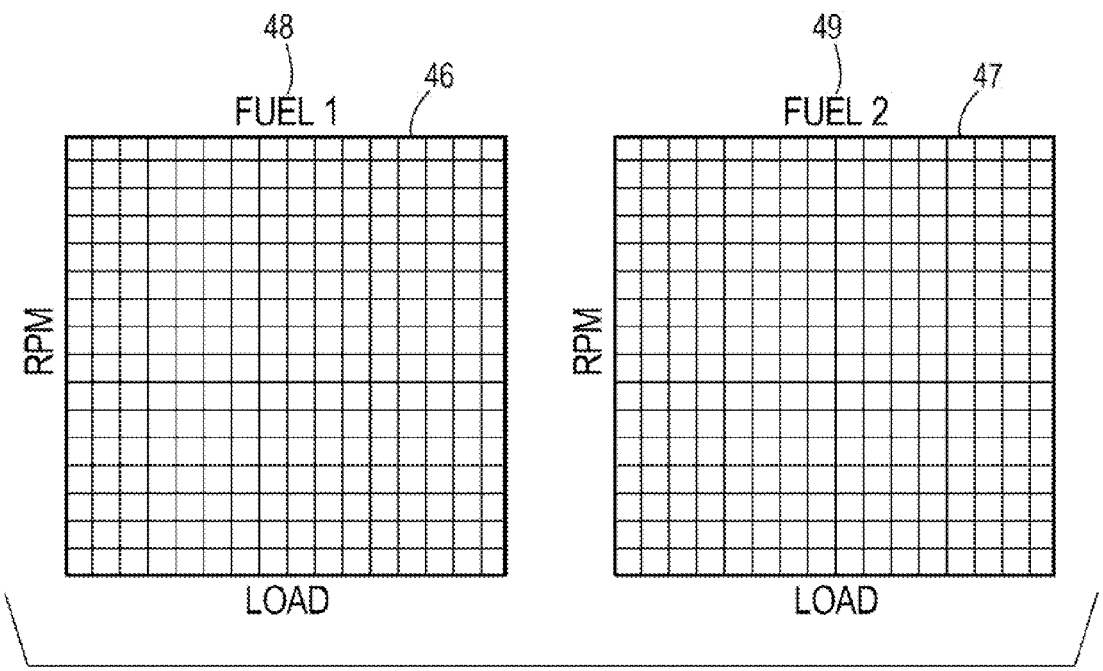
FIG. 4 depicts two tables of exemplary fuel-specific operating parameters, one for each of two different fuel types.

Each set of fuel-specific operating parameters comprises one or more stored tables and/or formulas that are calibrated to maximize the performance of the engine 9 with the fuel 48 or 49 being supplied to the engine. For example, FIG. 4 represents two hypothetical tables of data for two different fuels, a first fuel 48 and a second fuel 49, respectively. The representative table 46 is associated with an exemplary operating parameter calibrated for the first fuel 48, and the exemplary table 47 represents that operating parameter calibrated for the second fuel 49. Each table represents a hypothetical map of a calibrated operating parameter, which are exemplarily stored as a function of load and engine speed (RPM). The tables 46 and 47 may contain, for example, a plurality of ignition timing values stored as a function of load and engine speed. Likewise, the tables 46 and 47 may include values of a duration of air injection through the fuel injector during a single injection cycle as a function of load and engine speed. Furthermore, the tables 46 and 47 could dictate a fuel injection timing value stored as a function of load and engine speed. Still further, the tables 46 and 47 could provide a throttle plate position as a function of load and engine speed. In still other embodiments, the tables 46 and 47 may provide any fuel-specific operating parameter for each fuel 48 and 49, respectively.

Once the fuel type has been selected by the operator, the fuel selection module 44 of the ECU 20 may execute a verification process to verify that the user selected the correct fuel type for the fuel 48 or 49 being supplied to the engine 9. For example, the fuel selection module 44 and/or ECU 20 may access the output parameters of the engine (such as engine speed, torque, air fuel ratio, etc.) to verify that the engine is performing as expected. Alternatively or additionally, the knock control system 69 may be utilized to provide such verification. Mainly, if a knock is detected, or a knock above a predefined threshold is detected, the fuel selection module 44 may determine that the incorrect fuel type was selected and may take steps to reduce or eliminate the knock. For example, the knock control system 69, alone or in conjunction with other aspects of the ECU 20, may add fuel to decrease the air/fuel ratio, it may reduce the ignition spark advance, or both. Alternatively or additionally, the fuel selection module 44 may access to an alternate set of operating parameters, such as the set of fuel-specific operating parameters associated with another fuel type, or a set of engine protection operating parameters calibrated to eliminate knock rather than optimize output or performance of the engine 9. Additionally, an alert may be generated to notify an operator that the selected fuel type is incorrect. For example, the display 42 of the user interface 40 may alert the operator of the error.

In another embodiment, the fuel selection means for selecting a fuel type may be the fuel selection module 34 configured to automatically select the fuel type being delivered to the engine 9, such as based on one or more engine performance parameters or fueling characteristics. For example, the fuel selection module 44 may select the fuel type based on the spark timing or air/fuel ratios at a given engine speed or engine output. In such an embodiment, the fuel selection module 44 may select a fuel type and control the engine 9 based on the associated set of fuel-specific operating parameters. Additionally, the fuel selection module 44 may then assess the engine performance parameters and/or fueling characteristics. Alternatively or additionally, the fuel selection module 44 may utilize the knock control system 69 as described above to determine whether the selected fuel type is correct.

In another embodiment, the fuel selection module 44 may initiate operation of the engine 9 based on a default, or initial set of operating parameters, and may adjust the operation of the engine 9 to test engine performance and thereby automatically determine which fuel type should be selected. For example, the engine operation may be initiated using a default set of fuel-specific operating parameters associated with the lowest grade fuel type that the system 10 is calibrated for. The fuel selection module 44 and ECU 20 may then operate to test engine performance parameters and/or fueling characteristics to determine whether a higher-octane fuel is being supplied to the engine 9. For example, the spark timing in one or more of the piston cylinders 1-4 may be advanced by a predetermined amount, and the knock control system 69 may be used to detect whether the engine 9 is performing properly with the advanced spark time. If so, the fuel selection module 44 may determine that, for example, a high-octane racing fuel is present and that a racing fuel type should be selected. In still other embodiments, the fuel selection module may alter the air/fuel ratio and similarly assess the engine performance to determine what type of fuel is present.

Figure 5:
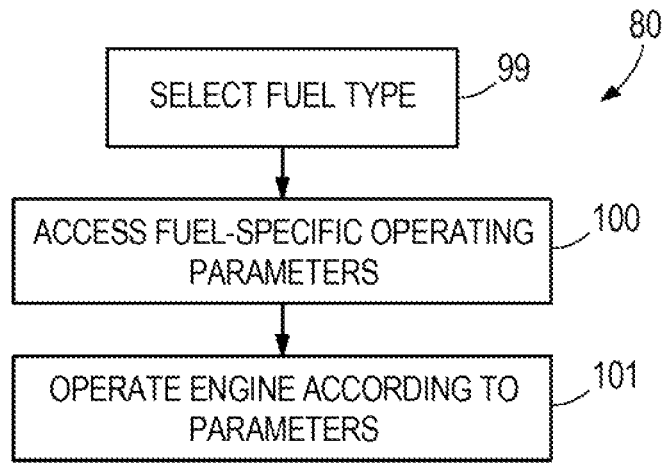
FIG. 5 is a flow chart depicting an exemplary embodiment of a method of operating a marine drive.

FIG. 5 depicts one embodiment of a method 80 of operating a marine drive wherein a fuel type is selected at step 99. Fuel-specific operating parameters are accessed at step 100 based on the selected fuel type, and the engine 9 is operated according to those parameters at step 101.

Figure 6:
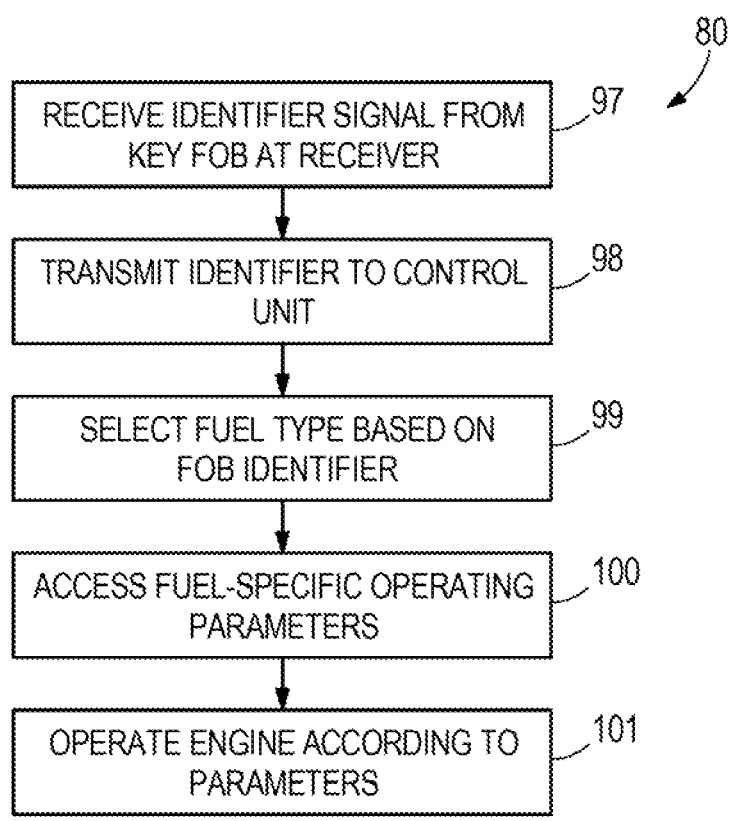
FIG. 6 is a flow chart depicting another embodiment of a method of operating the marine drive.

FIG. 6 depicts another embodiment of a method 80 of operating a marine drive. At step 97, an identifier signal from key fob 57 or 59 is received at receiver 62. The identifier is then transmitted to the ECU 20 at step 98. The ECU 20 then selects a fuel type based on the fob identifier, such as may be executed by the fuel selection module 44 as described above. Additionally, in embodiments such as that depicted in FIG. 1, having multiple fuel tanks 71 and 72 and a fuel switching valve 75 that switches between therebetween, the step of selecting a fuel type 99 may also include switching the fuel switching valve 75 to supply the fuel 48 or 49 associated with the selected fuel type. Fuel-specific operating parameters are then accessed at step 100 based on the fuel type associated with the fob identifier and selected thereby. At step 101, the engine 9 is operated according to those operating parameters.

Figure 7:
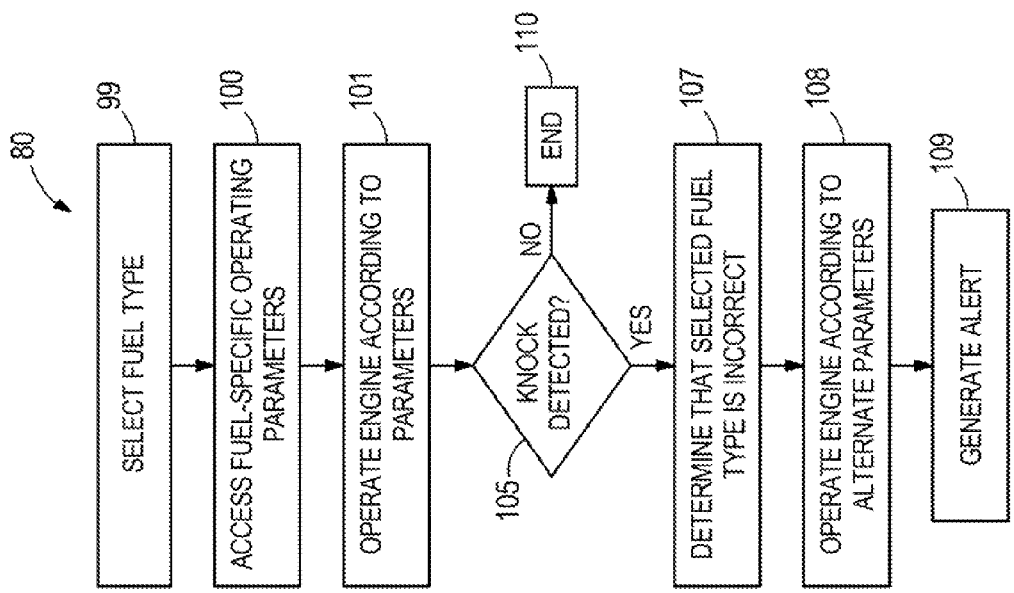
FIG. 7 is a flow chart depicting another embodiment of a method of operating the marine drive.

FIG. 7 depicts another embodiment of a method 80 of operating a marine drive. After carrying the steps 99 through 101 as described above, the fuel selection module 44 may execute steps to verify that the fuel type selected at step 99 is correct. At step 105, the fuel selection module 44 may determine in conjunction with the knock control system 69 whether a knock is detected. If no knock is detected, then the fuel selection module 44 continues to step 110 where it determines that the selected fuel type is correct and the process is completed. On the other hand, if a knock is detected at step 105, the fuel selection module 44 may determine that the selected fuel type is incorrect at step 107. Then, at step 108 the fuel selection module 44 and/or the ECU 20 may operate the engine 9 according to alternate operating parameters. An alert may be generated at step 109 to alert the operator that the fuel type selection is incorrect.

Figure 8:
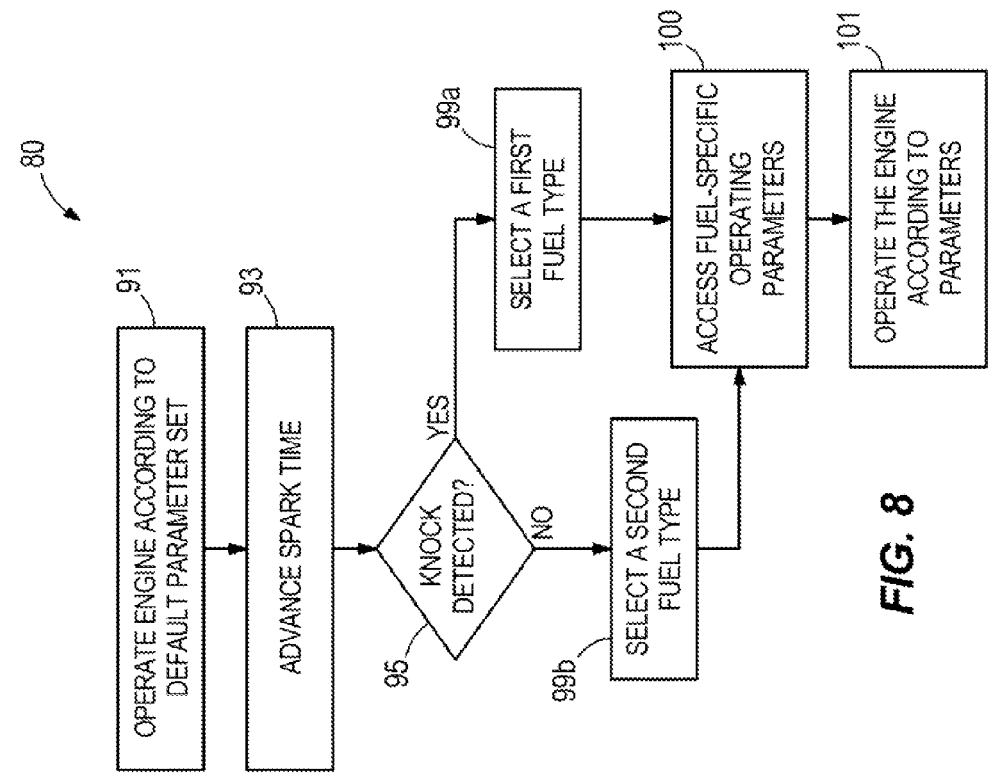
FIG. 8 is a flow chart depicting another embodiment of a method of operating the marine drive.

FIG. 8 depicts another embodiment of a method 80 of operating a marine drive wherein the fuel selection module 44 automatically selects a fuel type. Next, at step 91, the engine 9 is operated according to a default set of operating parameters. The spark time is then advanced at step 93. If a knock is detected at step 95, then the fuel selection module 44 may select a first fuel type, which may be a lower-grade fuel type, at step 99a. If a knock is not detected at step 95, then the fuel selection module 44 may select a second fuel type at step 99b, which may be a higher-grade or higher-octane fuel type. The fuel-specific operating parameters for whichever fuel type is selected are accessed at step 100, and then the engine is operated according to those parameters at step 101.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A marine drive system comprising:
    an engine;
    a fuel system that provides at least two different fuels to the engine, wherein the fuel system includes at least two fuel tanks, each containing a different one of the at least two different fuels;
    a fuel selection means for operator selection of a fuel type associated with one of the at least two different fuels contained in the at least two fuel tanks;
    a control unit;
    a storage medium storing at least two different sets of fuel-specific operating parameters, each set of fuel-specific operating parameters associated with a different fuel type, wherein each set of fuel-specific operating parameters includes at least one of a spark timing, fuel injection duration, fuel injection timing, intake airflow, and throttle responsiveness for the engine; and
    wherein the control unit
        receives an operator-selected fuel type,
        controls the fuel system to provide fuel only from the fuel tank containing the operator-selected fuel type,
        selects one of the at least two different sets of fuel-specific operating parameters based on the operator-selected fuel type, and
        controls the engine based on the selected set of fuel-specific operating parameters associated with the operator-selected fuel type.

2. The system of claim 1, wherein the fuel selection means includes at least two key fobs, each key fob associated with a different fuel type, wherein selecting the fuel type includes engaging a key fob receiver with the key fob associated with that fuel type.

3. The system of claim 2, wherein the key fob engages the key fob receiver to select the fuel type by being inserted into the key fob receiver.

4. The system of claim 2 wherein the key fob engages the key fob receiver to select the fuel type by wirelessly communicating with the key fob receiver.

5. The system of claim 4, wherein the key fob emits a radio frequency identifier received by the key fob receiver to select the fuel type.

6. The system of claim 1, wherein the fuel selection means includes one of a switch and a button operable to select a fuel type.

7. The system of claim 1, wherein the fuel selection means includes an application on a mobile device that allows the operator to select the fuel type on the mobile device and wirelessly communicate the fuel type to a receiver operably connected to the control unit.

8. The system of claim 1, wherein the fuel selection means is a user interface that allows an operator to select the fuel type in the fuel tank.

9. The system of claim 1, wherein the fuel selection means allows operator selection of one of at least a high octane fuel type and a standard octane fuel type, wherein the high octane fuel type has a higher octane rating than the standard octane fuel type.

10. The system of claim 1, wherein each set of fuel-specific operating parameters is a set of lookup tables containing control values for at least one of the spark timing, fuel injection duration, fuel injection timing, intake airflow, and throttle responsiveness.

11. A method of operating a marine drive, the method comprising:
    storing at least two different sets of fuel-specific operating parameters in a memory associated with a control unit, wherein each set of fuel-specific operating parameters is associated with a different one of at least two different fuel types and comprises at least one of a spark timing, fuel injection duration, fuel injection timing, intake airflow, and throttle responsiveness;
    receiving an operator selection of one of the at least two different fuel types at the control unit;
    accessing one of at least two different sets of fuel-specific operating parameters for a marine engine based on the operator-selected fuel type;
    controlling a fuel system to supply only one of at least two different fuels to the engine based on the operator-selected fuel type;
    controlling the marine engine based on the set of fuel-specific operating parameters associated with the operator-selected fuel type.

12. The method of claim 11, further including receiving at the control unit the selected fuel type from a user interface.

13. The method of claim 11, further comprising:
    detecting a knock with a knock sensor;
    determining that the selected fuel type is incorrect; and
    generating an alert.

14. The method of claim 13, further comprising:
    automatically accessing an alternate set of operating parameters upon detecting the knock; and
    controlling the engine based on the alternate set of operating parameters.

15. The method of claim 11, further comprising, activating one or more race performance control systems if the selected fuel type is a race fuel type.

* * * * *